(12) United States Patent
Flood

(10) Patent No.: US 11,074,557 B2
(45) Date of Patent: *Jul. 27, 2021

(54) SYSTEMS AND METHOD FOR INTERROGATING, PUBLISHING AND ANALYZING INFORMATION RELATED TO A WASTE HAULING VEHICLE

(71) Applicant: Advanced Custom Engineered Systems & Equipment Co., St. Charles, IL (US)

(72) Inventor: Christopher M. Flood, St. Charles, IL (US)

(73) Assignee: Advanced Custom Engineered Systems & Equipment Co., St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,926

(22) Filed: Jan. 12, 2021

(65) Prior Publication Data

US 2021/0133697 A1 May 6, 2021

Related U.S. Application Data

(63) Continuation of application No. 16/090,058, filed as application No. PCT/US2017/025569 on Mar. 31, 2017.

(Continued)

(51) Int. Cl.
*G06Q 10/00* (2012.01)
*B65F 1/14* (2006.01)
(Continued)

(52) U.S. Cl.
CPC .......... *G06Q 10/30* (2013.01); *B65F 1/1484* (2013.01); *B65F 3/00* (2013.01); *B65F 3/041* (2013.01);
(Continued)

(58) Field of Classification Search
CPC ........ G06Q 10/30; G06Q 50/00; G07C 5/008; G07C 5/02; B65F 3/00; B65F 1/1484;
(Continued)

(56) References Cited

U.S. PATENT DOCUMENTS

| 3,636,863 A | 1/1972 | Woyden |
| 3,765,147 A | 10/1973 | Ippolito et al. |

(Continued)

FOREIGN PATENT DOCUMENTS

| AU | 2005211634 A1 | 4/2007 |
| AU | 2006225303 A1 | 4/2008 |

(Continued)

OTHER PUBLICATIONS

Local Patent Rule 2.3 Disclosures from *Sonrai Systems, LLC, et al. v. AMCS Group, Inc.*, No. 1:16-cv-9404, Oct. 2017.

(Continued)

*Primary Examiner* — Nga X Nguyen
(74) *Attorney, Agent, or Firm* — McDonnell Boehnen Hulbert & Berghoff LLP

(57) ABSTRACT

A system and method for verifying waste fulfillment events in the absence of human intervention using the input of one or more vehicle sensor inputs, one or more waste disposal cycle inputs, and GPS information to augment or supplement optical scanning technology such as RFID tags is disclosed.

12 Claims, 6 Drawing Sheets

Related U.S. Application Data

(60) Provisional application No. 62/316,263, filed on Mar. 31, 2016.

(51) Int. Cl.
*B65F 3/00* (2006.01)
*B65F 3/04* (2006.01)
*G06Q 50/00* (2012.01)
*G07C 5/00* (2006.01)
*G07C 5/02* (2006.01)
*B65F 3/02* (2006.01)

(52) U.S. Cl.
CPC ............. *G06Q 50/00* (2013.01); *G07C 5/008* (2013.01); *G07C 5/02* (2013.01); *B65F 2003/0279* (2013.01); *B65F 2210/128* (2013.01); *B65F 2210/168* (2013.01)

(58) Field of Classification Search
CPC ............. B65F 3/041; B65F 2003/0279; B65F 2210/168; B65F 2210/128
See application file for complete search history.

(56) References Cited

U.S. PATENT DOCUMENTS

| | | |
|---|---|---|
| 4,854,406 A | 8/1989 | Appleton et al. |
| 4,953,109 A | 8/1990 | Burgis |
| 4,955,495 A | 9/1990 | Ruebesam |
| 5,004,392 A | 4/1991 | Naab |
| 5,014,206 A | 5/1991 | Scribner et al. |
| 5,119,894 A | 6/1992 | Crawford et al. |
| 5,209,312 A | 5/1993 | Jensen |
| 5,222,853 A | 6/1993 | Carson |
| 5,230,393 A | 7/1993 | Mezey |
| 5,303,642 A | 4/1994 | Durbin et al. |
| 5,304,744 A | 4/1994 | Jensen |
| 5,326,939 A | 7/1994 | Schafer |
| 5,389,346 A | 2/1995 | Copeland, Jr. |
| 5,401,915 A | 3/1995 | Schafer |
| 5,416,706 A | 5/1995 | Hagenbuch |
| 5,464,489 A | 11/1995 | De Graaf |
| 5,565,846 A | 10/1996 | Geiszler et al. |
| 5,631,835 A | 5/1997 | Hagenbuch |
| 5,644,489 A | 7/1997 | Hagenbuch |
| 5,726,884 A | 3/1998 | Sturgeon et al. |
| 5,740,050 A | 4/1998 | Ward, II |
| 5,837,945 A | 11/1998 | Cornwell et al. |
| 5,861,805 A | 1/1999 | Reeves |
| 5,909,480 A | 6/1999 | Reynaud et al. |
| 5,947,256 A | 9/1999 | Patterson |
| 5,967,028 A | 10/1999 | Schomisch et al. |
| 6,021,712 A | 2/2000 | Harrop |
| 6,055,902 A | 5/2000 | Harrop et al. |
| 6,170,318 B1 | 1/2001 | Lewis |
| 6,191,691 B1 | 2/2001 | Serrault |
| 6,206,282 B1 | 3/2001 | Hayes, Sr. et al. |
| 6,302,461 B1 | 10/2001 | Debras et al. |
| 6,318,636 B1 | 11/2001 | Reynolds et al. |
| 6,412,406 B1 | 7/2002 | Flood et al. |
| 6,421,080 B1 | 7/2002 | Lambert |
| 6,429,776 B1 | 8/2002 | Alicot et al. |
| 6,448,898 B1 | 9/2002 | Kasik |
| 6,510,376 B2 | 1/2003 | Burnstein et al. |
| 6,600,418 B2 | 7/2003 | Francis et al. |
| 6,601,015 B1 | 7/2003 | Milvert et al. |
| 6,647,200 B1 | 11/2003 | Tanaka |
| 6,759,959 B2 | 7/2004 | Wildman |
| 7,225,980 B2 | 6/2007 | Ku et al. |
| 7,256,682 B2 | 8/2007 | Sweeney, II |
| 7,275,645 B2 | 10/2007 | Mallett et al. |
| 7,318,529 B2 | 1/2008 | Mallett et al. |
| 7,328,842 B2 | 2/2008 | Wagner et al. |
| 7,385,510 B2 | 6/2008 | Childress et al. |
| 7,436,303 B2 | 10/2008 | Tourrilhes et al. |
| 7,454,358 B2 | 11/2008 | Mallett et al. |
| 7,456,418 B1 | 11/2008 | Stevens et al. |
| 7,487,100 B2 | 2/2009 | Mallett et al. |
| 7,501,951 B2 | 3/2009 | Maruca et al. |
| 7,511,611 B2 | 3/2009 | Sabino et al. |
| 7,518,506 B2 | 4/2009 | Lee et al. |
| 7,525,443 B2 | 4/2009 | Littrell |
| 7,591,421 B2 | 9/2009 | Linton et al. |
| 7,609,406 B2 | 10/2009 | Roth et al. |
| 7,639,136 B1 | 12/2009 | Wass et al. |
| 7,660,724 B2 | 2/2010 | Mallett et al. |
| 7,728,730 B2 | 6/2010 | Langlois et al. |
| 7,870,042 B2 | 1/2011 | Maruca et al. |
| 8,014,863 B2 | 9/2011 | Zhang et al. |
| 8,015,029 B2 | 9/2011 | Flood |
| 8,020,767 B2 | 9/2011 | Reeves et al. |
| 8,056,817 B2 | 11/2011 | Flood |
| 8,109,759 B2 | 2/2012 | Robertson et al. |
| 8,146,798 B2 * | 4/2012 | Flood .................... B65F 1/1484 235/375 |
| 8,165,277 B2 | 4/2012 | Chen et al. |
| 8,185,277 B2 | 5/2012 | Flood et al. |
| 8,210,428 B2 | 7/2012 | Flood |
| 8,714,440 B2 | 5/2014 | Flood et al. |
| 9,251,388 B2 | 2/2016 | Flood |
| 9,396,453 B2 | 7/2016 | Hynes et al. |
| 10,594,991 B1 * | 3/2020 | Skolnick ................ H04N 7/188 |
| 2001/0028032 A1 | 10/2001 | Church et al. |
| 2002/0077875 A1 | 6/2002 | Nadir |
| 2002/0105424 A1 | 8/2002 | Alicot et al. |
| 2002/0163577 A1 | 11/2002 | Myers |
| 2002/0180588 A1 | 12/2002 | Erickson et al. |
| 2002/0196150 A1 | 12/2002 | Wildman |
| 2003/0025599 A1 | 2/2003 | Monroe |
| 2003/0031543 A1 | 2/2003 | Elbrink |
| 2003/0069716 A1 | 4/2003 | Martinez |
| 2003/0071736 A1 | 4/2003 | Brazier et al. |
| 2004/0123812 A1 | 7/2004 | Condon |
| 2004/0133484 A1 | 7/2004 | Kreiner et al. |
| 2004/0145472 A1 | 7/2004 | Schmidtberg et al. |
| 2004/0199401 A1 | 10/2004 | Wagner et al. |
| 2004/0215351 A1 | 10/2004 | Kiire et al. |
| 2004/0233284 A1 | 11/2004 | Lesesky et al. |
| 2004/0257203 A1 | 12/2004 | Maltsev et al. |
| 2005/0018049 A1 | 1/2005 | Falk |
| 2005/0080520 A1 | 4/2005 | Kline et al. |
| 2005/0088299 A1 | 4/2005 | Bandy et al. |
| 2005/0126405 A1 | 6/2005 | Imperato |
| 2006/0012481 A1 | 1/2006 | Rajapakse et al. |
| 2006/0032917 A1 | 2/2006 | Ritter |
| 2006/0080819 A1 | 4/2006 | McAllister |
| 2006/0157206 A1 | 7/2006 | Weik, III et al. |
| 2006/0177119 A1 | 8/2006 | McPheely et al. |
| 2006/0208072 A1 | 9/2006 | Ku et al. |
| 2006/0208859 A1 | 9/2006 | Hougen et al. |
| 2006/0220922 A1 | 10/2006 | Brinton et al. |
| 2006/0221363 A1 | 10/2006 | Roth et al. |
| 2006/0253297 A1 | 11/2006 | Mallett et al. |
| 2006/0273180 A1 | 12/2006 | Ammond et al. |
| 2007/0014693 A1 | 1/2007 | Kantrowitz et al. |
| 2007/0025600 A1 | 2/2007 | Ghebreyesus |
| 2007/0033108 A1 | 2/2007 | Luhr |
| 2007/0085676 A1 | 4/2007 | Lee et al. |
| 2007/0109103 A1 | 5/2007 | Jedrey et al. |
| 2007/0112620 A1 | 5/2007 | Johnson et al. |
| 2007/0126592 A1 | 6/2007 | Littrell |
| 2007/0143079 A1 | 6/2007 | Duxbury et al. |
| 2007/0217761 A1 | 9/2007 | Chen et al. |
| 2007/0227125 A1 | 10/2007 | Robertson et al. |
| 2007/0236352 A1 | 10/2007 | Allen, Jr. et al. |
| 2007/0250339 A1 | 10/2007 | Mallet et al. |
| 2007/0257857 A1 | 11/2007 | Marino et al. |
| 2007/0260466 A1 | 11/2007 | Casella et al. |
| 2007/0262878 A1 | 11/2007 | Maruca et al. |
| 2007/0268759 A1 | 11/2007 | Sabino et al. |
| 2008/0001746 A1 | 1/2008 | Childress et al. |
| 2008/0010197 A1 | 1/2008 | Scherer |
| 2008/0061125 A1 | 3/2008 | Langlois et al. |
| 2008/0061977 A1 | 3/2008 | Maruca et al. |

(56) References Cited

U.S. PATENT DOCUMENTS

| | | | |
|---|---|---|---|
| 2008/0077541 | A1 | 3/2008 | Scherer et al. |
| 2008/0169342 | A1 | 7/2008 | Gonen |
| 2008/0185540 | A1 | 8/2008 | Turner et al. |
| 2008/0197059 | A1 | 8/2008 | Mallett et al. |
| 2008/0197194 | A1 | 8/2008 | Flood |
| 2008/0198021 | A1 | 8/2008 | Flood |
| 2008/0202357 | A1 | 8/2008 | Flood |
| 2008/0211637 | A1 | 9/2008 | Smith |
| 2008/0237251 | A1 | 10/2008 | Barber |
| 2008/0275287 | A1 | 11/2008 | Stevens et al. |
| 2008/0297314 | A1 | 12/2008 | Kuwako et al. |
| 2008/0308631 | A1 | 12/2008 | Mitschele et al. |
| 2009/0276299 | A1 | 11/2009 | Gonen et al. |
| 2010/0088203 | A1 | 4/2010 | Hynes et al. |
| 2010/0116881 | A1 | 5/2010 | Flood et al. |
| 2010/0119340 | A1 | 5/2010 | Flood et al. |
| 2010/0119341 | A1 | 5/2010 | Flood et al. |
| 2010/0167704 | A1 | 7/2010 | Villemaire |
| 2010/0179912 | A1* | 7/2010 | Curotto .................. G01G 23/42 705/308 |
| 2011/0279245 | A1 | 11/2011 | Hynes et al. |
| 2012/0120449 | A1 | 5/2012 | Flood et al. |
| 2014/0182951 | A1* | 7/2014 | Curotto .................. G01G 19/08 177/1 |
| 2014/0239059 | A1 | 8/2014 | Flood et al. |
| 2014/0340197 | A1* | 11/2014 | Flood .................. G06K 19/145 340/5.81 |
| 2017/0109704 | A1* | 4/2017 | Lettieri .............. G06Q 10/1093 |

FOREIGN PATENT DOCUMENTS

| | | |
|---|---|---|
| CA | 2678933 C | 10/2016 |
| DE | 3933795 A1 | 4/1991 |
| DE | 19708204 C2 | 12/1999 |
| EP | 0500213 A1 | 8/1992 |
| EP | 0557238 B1 | 5/1997 |
| EP | 0899215 A1 | 3/1999 |
| GB | 2464272 A | 4/2010 |
| GB | 2464272 B | 2/2011 |
| JP | 7033455 | 3/1995 |
| JP | 09245168 | 9/1997 |
| JP | 3-241180 B2 | 12/2001 |
| JP | 2003-246409 A | 9/2003 |
| JP | 2004-137042 A | 5/2004 |
| JP | 2005-008339 A | 1/2005 |
| JP | 2005-063217 A | 3/2005 |
| JP | 2005-067850 A | 3/2005 |
| JP | 2006-44483 A | 2/2006 |
| JP | 2006-163324 A | 6/2006 |
| JP | 2006-215857 A | 8/2006 |
| JP | 2007-33455 A | 2/2007 |
| JP | 2007-063014 A | 3/2007 |
| JP | 6-044483 B2 | 12/2016 |
| KR | 10-2006-0005812 A | 1/2006 |
| KR | 10-2006-0026226 A | 3/2006 |
| KR | 20060109306 A | 10/2006 |
| KR | 10-2007-0032381 A | 3/2007 |
| KR | 10-0732381 | 6/2007 |
| RU | 2230015 C1 | 6/2004 |
| RU | 113395 U1 | 2/2012 |
| WO | 97/03768 A1 | 2/1997 |
| WO | 98/38593 A1 | 9/1998 |
| WO | 99/39899 A1 | 8/1999 |
| WO | 2008/103820 A2 | 10/2008 |
| WO | 2010/054232 A1 | 5/2010 |

OTHER PUBLICATIONS

Sep. 13, 2019—U.S. Final Office Action—U.S. Appl. No. 15/011,940.

First Amended Complaint, *Sonrai Systems, LLC and Advanced Custom Engineered Systems & Equipment Co.* v. *AMCS Group Inc., Lakeshore Recycling Systems, LLC and Rehrig Pacific Company*, Civil Action No. 1:16 cv 9404, Dec. 7, 2016.

Chowdhury, Belal and Chowdhury, Morshed U., "RFID-based Real-time Smart Waste Management System", Australasian Telecommunication Networks and Applications Conference, Dec. 2-5, 2007, Christchurch, New Zealand.

Wyatt, Josh, "Maximizing Waste Management Efficiency Through the Use of RFID", Texas Instruments, Apr. 2008.

O'Connor Mary Catherine, "Greek RFID Pilot Collects Garbage", RFID Journal, 2007.

McAdams Cheryl L., "RFID The Missing Link to Comprehensive Automated Refuse Collection and Recycling", Waste Age, Apr. 1994, pp. 143-144, 147.

Exhibits to Petition for Inter Parties Review of U.S. Pat. No. 8,146,798 Pursuant to 35 U.S.C. Secs. 311-319, 37 C.F.R. Section 42, Oct. 31, 2018.

PCT International Search Report and Written Opinion of the International Searching Authority dated Aug. 14, 2017.

Dec. 11, 2018—U.S. Non-Final Office Action—U.S. Appl. No. 15/406,970.

International Search Report for PCT/US2008/054571 dated Aug. 14, 2008.

International Preliminary Report on Patentability for PCT/US2008/054571 dated Aug. 26, 2009.

Written Opinion of ISA for PCT/US2008/054571 dated Aug. 14, 2008.

May 17, 2019—U.S. Non-Final Office Action—U.S. Appl. No. 15/011,940.

Jul. 26, 2019—(CA) Office Action Appl No. 3,019,645.

Oct. 18, 2019—U.S. Non-Final Office Action—U.S. Appl. No. 14/593,764.

Aug. 14, 2017—(WO) International Search Report and Written Opinion—APP PCT/US2017/025569.

International Search Report for PCT/US2009/063601 dated Mar. 12, 2010.

International Preliminary Report on Patentability for PCT/US2009/063601 dated May 10, 2011.

Written Opinion of ISA for PCT/US2009/063601 dated Mar. 12, 2010.

Supplementary European Search Report for EP 08730384 dated Oct. 17, 2011.

First Examination Report for EP 08730384.8 dated Nov. 22, 2012.

Petition for Inter Parties Review of U.S. Pat. No. 8,146,798 Pursuant to 35 U.S.C. Secs. 311-319, 37 C.F.R. Section 42 (80 pages), Oct. 31, 2018.

Petitioner's Reply to Patent Owner's Response to Petition, Case No. IPR2018-00139 dated Jan. 25, 2019 (30 pages).

Petitioner's Demonstratives, Petitioner Document 1033 in Case No. IPR2018-00139 involving U.S. Pat. No. 8,146,798, dated Feb. 15, 2019, (50 pages).

Exhibit 1032 of Petitioner's Reply to Patent Owner's Response to Petition served Jan. 25, 2019 entitled Morgan D. Rosenberg—Essentials of Patent Claim Drafting (2019 Edition) Section 3.02 (12 pages).

Final Written Decision, Case IPR2018-00139, U.S. Pat. No. 8,146,798, Paper No. 35 dated May 20, 2019 (36 pages).

Nov. 8, 2018—U.S. Non-Final Office Action—U.S. Appl. No. 14/593,764.

\* cited by examiner

SYSTEMS AND METHOD FOR INTERROGATING, PUBLISHING AND ANALYZING INFORMATION RELATED TO A WASTE HAULING VEHICLE

PRIORITY

This application a continuation of co-pending U.S. application Ser. No. 16/090,058, filed Sep. 28, 2018, which is a national stage entry of PCT/US2017/025569 and claims the benefit of U.S. Provisional No. 62/316,263 filed on Mar. 31, 2016. In addition, this application is a continuation-in-part of co-pending U.S. application Ser. No. 15/406,970, filed on Jan. 16, 2017, which is a continuation of U.S. application Ser. No. 14/269,771, now U.S. Pat. No. 9,546,040, filed on May 5, 2014, which is a continuation of U.S. application Ser. No. 13/353,900, now U.S. Pat. No. 8,714,440, filed on Jan. 19, 2012, which was a continuation of U.S. application Ser. No. 12/274,273, now U.S. Pat. No. 8,146,798, filed on Nov. 19, 2008, which was a continuation-in-part of U.S. application Ser. No. 12/267,367, filed on Nov. 7, 2008 and U.S. application Ser. No. 12/267,340, now U.S. Pat. No. 8,815,277, also filed on Nov. 7, 2008. This application is a continuation of co-pending U.S. application Ser. No. 15/011,940, filed on Feb. 1, 2016, which is a continuation of U.S. application Ser. No. 13/895,138, now U.S. Pat. No. 9,251,388, filed on May 15, 2013. Each application is hereby incorporated by reference as if fully set forth herein.

TECHNICAL FIELD

The present disclosure relates to waste hauling and removing. In particular, the present disclosure teaches a system architecture and method for collecting, analyzing, and providing information for client interfaces related to waste hauling vehicles and the like which may be implemented with passive interrogation techniques so as to lessen the burden upon the vehicle operators while providing real time access via a GPS connection to a remote location (e.g., a fleet operator using a browser, mobile device or the like).

BACKGROUND

The collection and transportation of trash and recyclables from residential, commercial, industrial and large residential facilities is a major industry in the United States and throughout the civilized world. Typically, trash and recyclables are accumulated and temporarily stored in waste material receptacles such as trash cans and dumpsters. When filled, or at regularly scheduled intervals, trash and recyclables from the containers are transported for the eventual recycling, incineration and/or disposal into landfills.

Customers typically pay for trash and recyclables removal services based on the amount of trash and recyclables removed and the number of trash and recyclables pickups over a period of time. The compacting of trash and recyclables at a customer's location typically reduces the number of pickups. A successful trash and recyclables compactor is disclosed in U.S. Pat. No. 6,412,406, titled Trash Compactor and owned by Advanced Custom Engineered Systems & Equipment, Inc., Carol Stream, Ill.

These industrial, commercial and large residential bins and compactors are collected from different locations and hauled to a central location. Normally, those hauling the trash and recyclables are sent from a central location and dispatched to the different locations. In practice, paper logs or schedules document the hauler's runs (e.g., trash and recyclables to pick-up, trash and recyclables being picked-up, and trash and recyclables picked-up). The haulers are given their routes in person or over the phone. The haulers, in turn, keep in touch with the central location generally by cell phone or radio.

For large organizations this can be a very complicated task as there are many haulers and many customers needing their trash and recyclables collected, picked-up and hauled away. In addition, commercial, industrial and large residential (e.g., condos and apartment buildings) trash and recyclables compactors and balers must be monitored for maintenance and repair. This too requires time and energy for the haulers and/or representatives (of the service provider) to monitor and inspect.

It should also be recognized that these industrial, commercial and large residential bins, balers and compactors require both period maintenance and emergency demand repair services. Normally, those repairing the equipment are sent from a central location and dispatched to the different locations. In practice, paper logs or work orders document the repair person's time (e.g., drive time, time spent performing the repairs, parts and materials used, etc.). The repair companies use a variety of management tools. For example, some are given their routes in person or over the phone. The service providers, in turn, keep in touch with the central location generally by cell phone or radio.

For large organizations this can be a very complicated to coordinate and to verify that the charges for these services are fair and accurate as there are many service providers and many customers needing their compactors, bins and balers repaired. This too requires time and energy for the haulers and/or representatives (of the service provider) to monitor and inspect. Furthermore, it may be desirous for certain waste hauling vehicle service providers to provide access and support to some but not all participating vehicles so as to enable connection by multiple fleet operators without a comingling of confidential vehicle fleet or route information.

In addition, it must be recognized that trash and recyclables compactors, balers and bins must further be monitored for maintenance and repair.

Methods of improving the refuse collection are disclosed in commonly assigned and co-pending U.S. Patent Application Publication No. 2008-0197194 A1, published on Aug. 21, 2008; U.S. Patent Application Publication No. 2008-0198021 A1, published on Aug. 21, 2008; and U.S. Patent Application Publication No. 2008-0202357 A1, published on Aug. 28, 2008. These publications are hereby incorporated by reference as if fully set forth herein, and generally disclose systems for communicating with receptacles, etc.

One opportunity that exists with refuse removal is to improve communication between the vehicles making refuse pick-ups (emptying receptacles) and the central station or dispatcher. Currently, the dispatcher may be in contact with the vehicle via radio or telephone transmission. However, it is not cost-effective or feasible for the dispatcher to be in constant contact with every vehicle out in the field. Thus, it is impossible for the dispatcher to relay account information associated with each receptacle to a vehicle. It would be advantageous to provide such information to the vehicle to prevent pick-up and emptying of receptacles owned or managed by entities delinquent in their payment of invoices. Also, a given account may have special instructions, such as an additional oversized pick-up, for a discrete single day or event. The dispatcher currently has no way of assuring that the special instructions are provided to the vehicle in a timely manner.

The applicants' co-pending inventions, such as those disclosed in U.S. patent application Ser. No. 15/406,970, provide solutions to these and other problems through the use of, for instance, RFID reading of waste containers coordinated with a central database to provide service fulfillment verification notice wirelessly to a remote terminal. However, depending upon the circumstances of the system requirement, there exist challenges whereby the RFID tags on waste containers may not be readable by the truck operator. Moreover, due to time limitations, it may be less desirable to require truck operator implementation, e.g., reading containers with a hand held scanner or by other RFID readers may be too time consuming and/or prone to error. Finally, due to errors in the RFID or similar tags (e.g., through mis-assignment of information during the assembly and deployment of the waste container, or mistaken switching of two waste containers), there can be the possibility that the RFID tag is read properly, but provides incorrect service fulfillment verification data to the truck fleet operator.

The present invention is provided to solve the problems discussed above and other problems, and to provide advantages and aspects not provided by prior waste and refuse collection systems and apparatuses of this type. A full discussion of the features and advantages of the present invention is deferred to the following detailed description, which proceeds with reference to the accompanying drawings.

SUMMARY

One aspect of the present invention is directed to a system and method for recording customer service fulfillment events. The method comprises the steps of: (1) recording a series of body events (e.g., vehicle operation and waste service cycle steps) on a waste hauling truck; (2) determining whether the truck is located in a preselected zone or at a predetermined location; (3) and associating the body events with a waste service fulfillment event.

This aspect of the present invention may further comprise one or more of the following steps: (1) establishing a remote database having information associated with a customer location and a unique identifier for waste containers used by that customer; (2) providing multiple truck body sensor inputs to a controller unit on the truck, such sensor inputs including but not limited to engine transmission variable, GPS location, and waste disposal cycle events; (3) providing such sensor inputs from the controller unit to the remote data base for generating a waste fulfillment event; and (4) providing a waste fulfillment report associated with the customer location based upon the multiple body inputs and GPS location associated with the sensor; and 5) providing a reporting mechanism for the waste fulfillment event to the waste truck hauler.

Another aspect of the present invention is directed to actuating a truck mounted camera to verify the occurrence of a waste fulfillment event. This method comprises the step of issuing a signal from the remote database to the controller unit on the truck to actuate capturing data by the camera in response to receiving a predetermined sequence of truck body sensor inputs in combination with GPS information corresponding to a preselected service zone and/or a customer location. This step can further permit the reading by the truck mounted camera of one or more unique identifiers located (for instance) on the waste container being disposed.

Other features and advantages of the invention will be apparent from the following specification taken in conjunction with the following drawings.

BRIEF DESCRIPTION OF THE FIGURES

To understand the present invention, it will now be described by way of example, with reference to the accompanying drawings in which.

DETAILED DESCRIPTION

Figure 1:
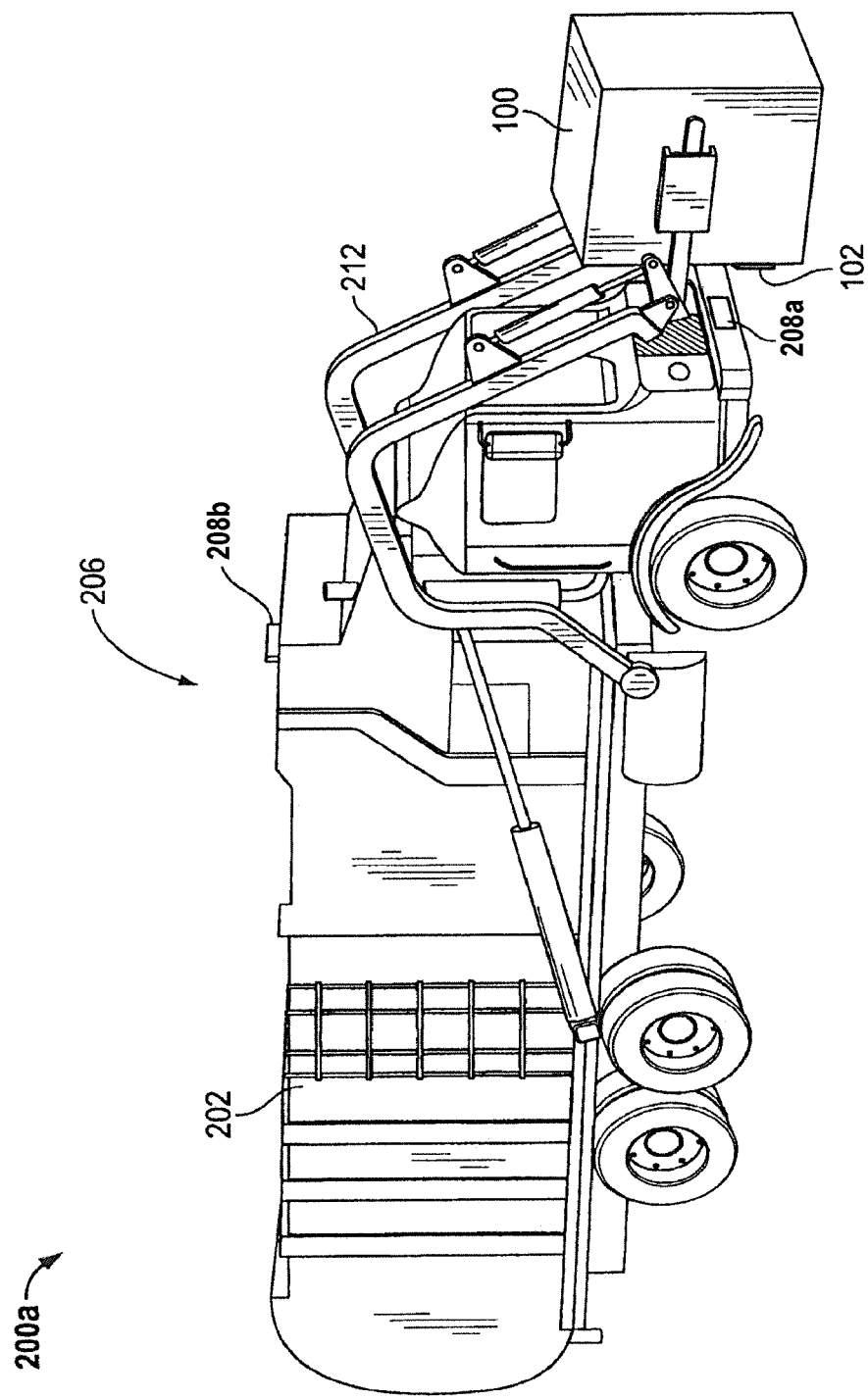
FIG. 1 is a perspective view of a waste removal and hauling vehicle of the present invention.
Figure 2:
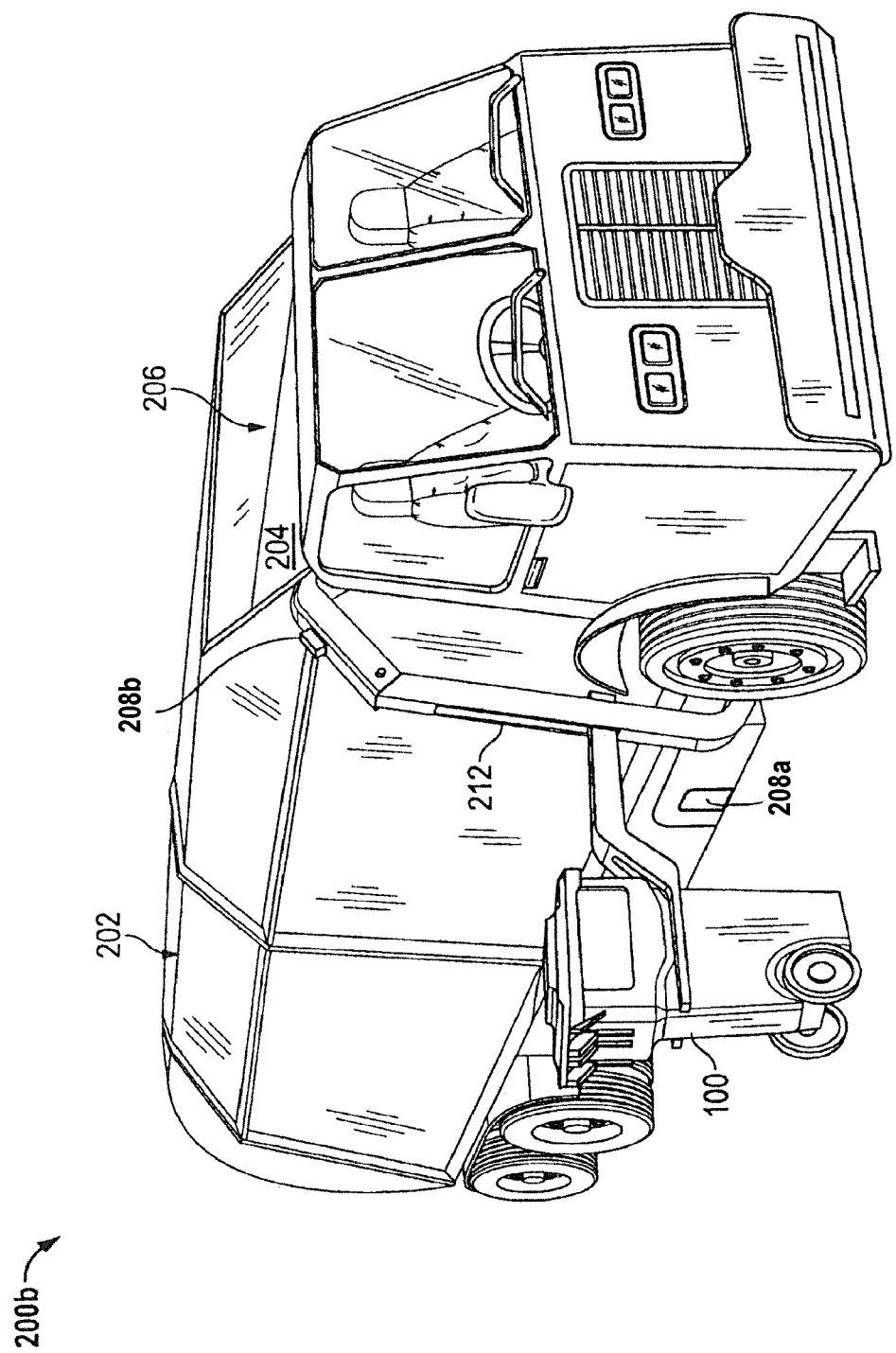
FIG. 2 is a perspective view of a second waste removal and hauling vehicle of the present invention.
Figure 3:
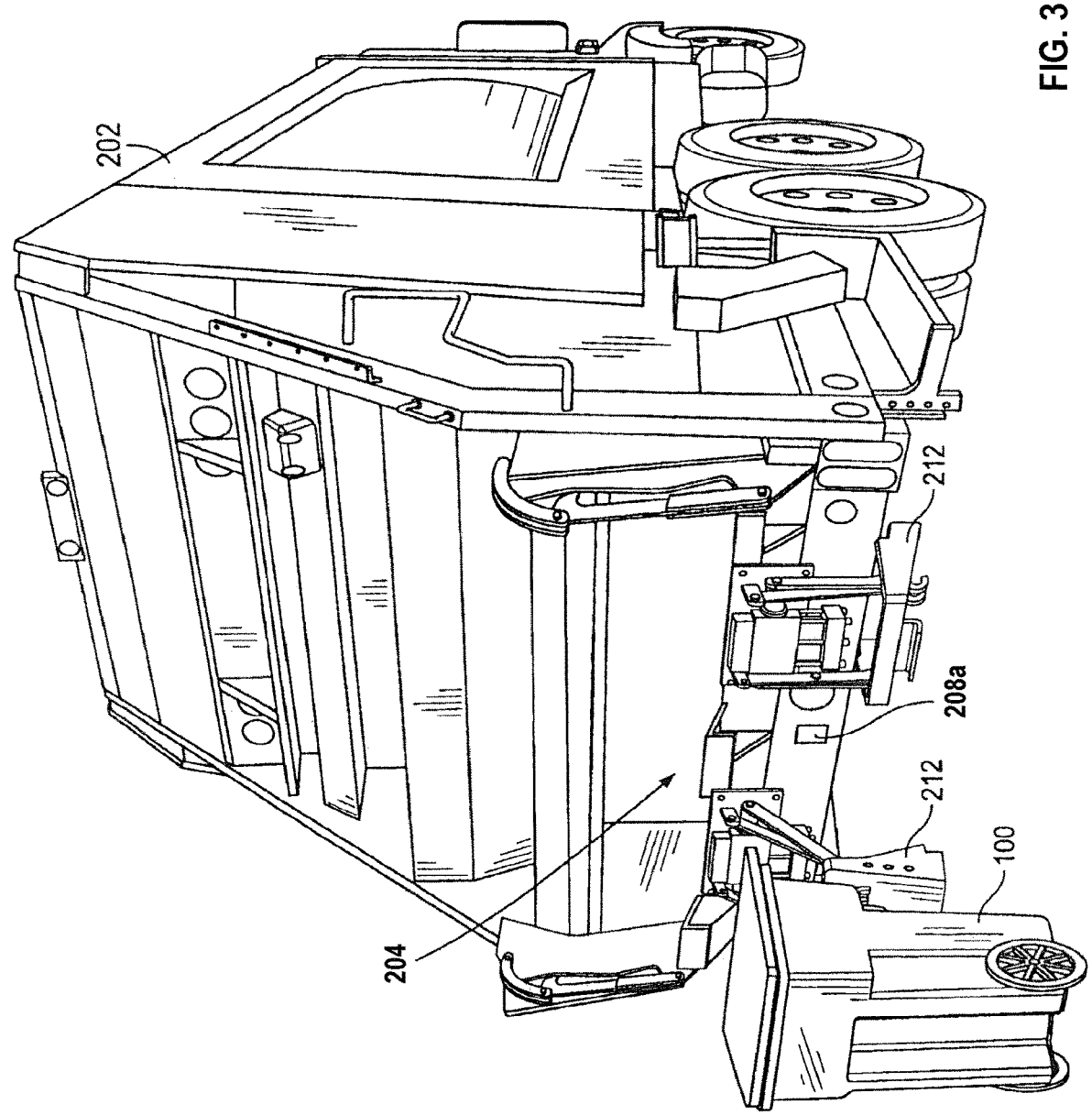
FIG. 3 is a perspective view of a third waste removal and hauling vehicle of the present invention.
Figure 4:
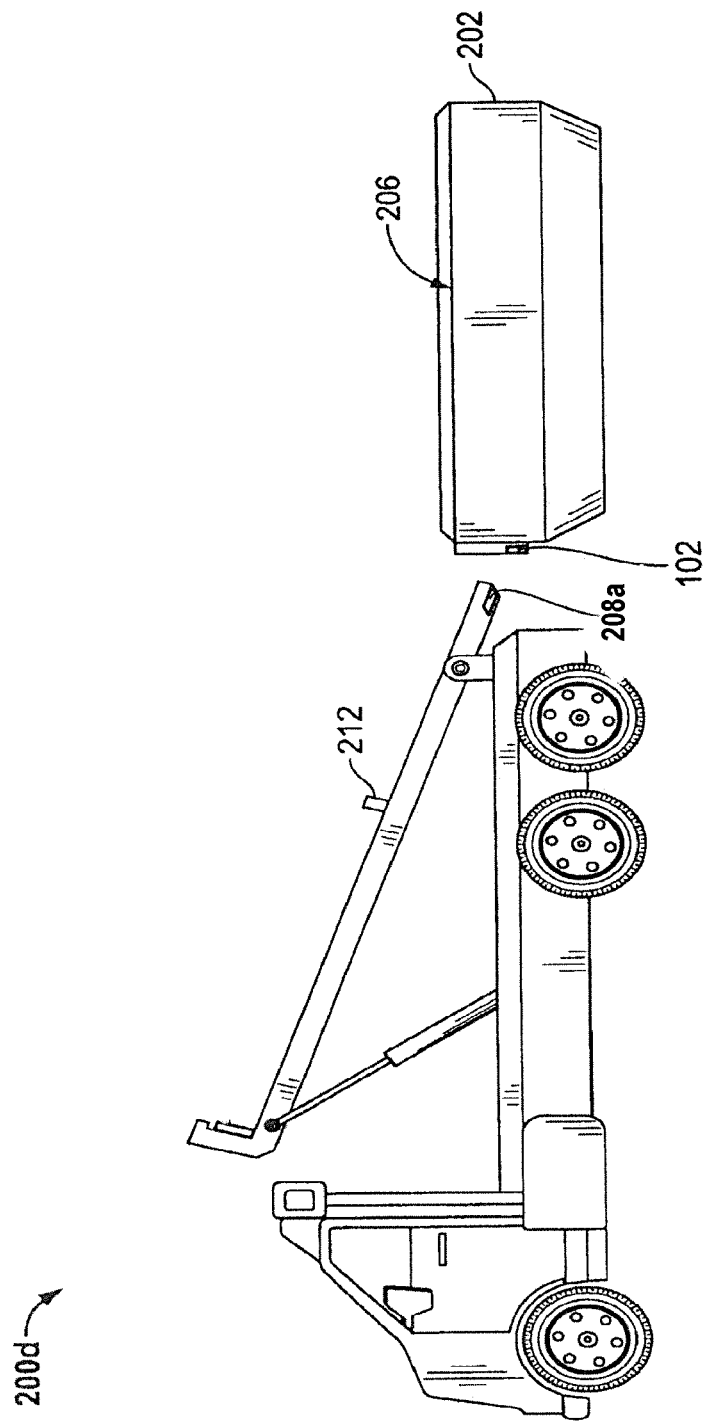
FIG. 4 is a perspective view of a fourth waste removal and hauling vehicle of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-5, the present invention is directed to waste removal and hauling vehicles and systems or methods incorporating such vehicles with sensors and an operational network to facilitate proper, efficient and effective waste monitoring and collection. The inventors contemplate that the present invention will provide a check, augmentation and or replacement of optical scanning of RFID tags and the like. The inventors further contemplate that the present invention will provide more effective communication between waste hauling vehicles and a dispatcher located at an external site. As best illustrated by the block diagram in FIG. 6, the overall system of the invention 10 comprises a receptacle 100, preferably a plurality of receptacles located at a plurality of locations throughout a municipality or a zone, a refuse or waste hauling vehicle 200, an external site 300, typically a central station, management office, dispatcher or the like, and a handheld or truck mounted reader/printer transmitter means 400 used in an example of a RFID reading functionality.

Figure 5:
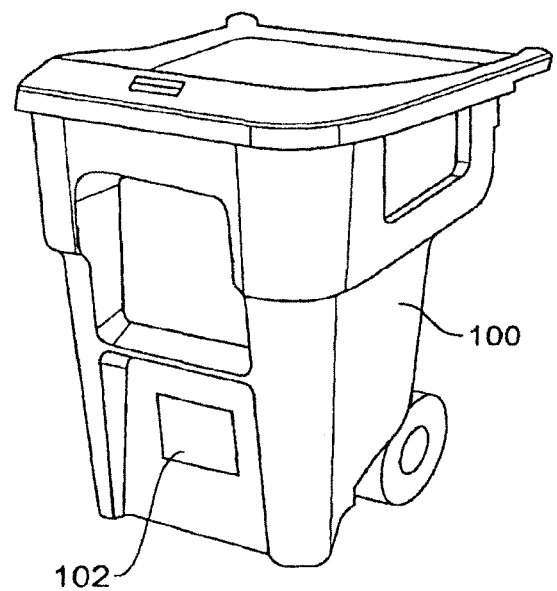
FIG. 5 is a perspective view of a waste bin used in accord with the present invention.
Figure 5:
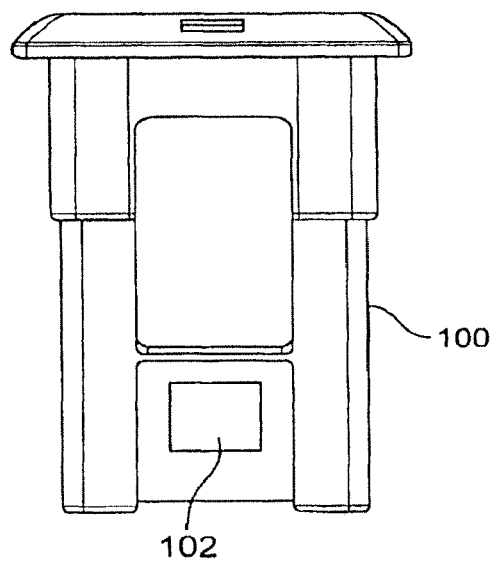

As shown in FIG. 5, each receptacle 100 is preferably outfitted with a means of communicating or transmitting a signal carrying an unique identifier associated with the receptacle 102, such as a radio frequency identification (RFID) tag. RFID tags are well-known in the retail industry for identifying products. While RFID, and in particular passive RFID tags are discussed herein, it is recognized that other identifying or alerting tags can be used. Many are known and perhaps others in the future may be used to achieve the same result. For example, electrical article surveillance (EAS) tags can be used. EAS tags are commonly used to prevent shoplifting from retail stores. The EAS tags are attached to merchandise and are removed or deactivated by the clerks when the item is properly bought or checked out. At the exits of stores, a detection system sounds an alarm or otherwise alerts the staff when it senses active tags. These tags are typically made of a strip of amorphous metal (metglas) having a low magnetic saturation value. This strip is also lined with a strip of ferromagnetic material with a coercive field (magnetic "hardness") Detection is achieved by sensing harmonics and sum or difference signals generated by the non-linear magnetic response of the material under a mixture of low-frequency (in the 10 Hz to 1000 Hz range) magnetic fields.

The identifier associated with the receptacle is preferably a discreet identifier which is assigned to the receptacle 100. The identifier information is stored on a database typically located at the external site 300, and electronically joined with an account to which the receptacle 100 belongs. In other words, account information is housed on a database located at the external site 300. Each account has one or more receptacle identifiers associated with it, and the database carries with it information typical to the management of any business account, for example, special instructions, accounts receivable, last receipt, last invoice, amount in arrears, days since last payment, historical account information, contact information, owner, etc.

Referring to FIG. 1-4, various vehicles 200a-d used in conjunction with the system 10 of the invention are illustrated. These vehicles 200a-d are intended to be examples of the types of waste removing and hauling vehicles used to transport refuse today, and the broad aspects of the invention should not be limited to the specific examples unless otherwise claimed. It should also be understood that the vehicles 200a-d and related concepts of the external site 300 and the receptacle 100 can be used alone or, in combination with the camera event capture concepts described herein.

Each of the vehicles 200a-d includes a waste bin 202 located above a baseline upon which the vehicle 200a-d is supported, generally the ground. The waste bin 202 includes a chamber 204 and an emptying site 206. The refuse within the receptacles 100 is loaded into the chamber 204 via the emptying site 206 (with most variants also providing a lift arm 212 or similar lift mechanism). One of ordinary skill in the art of waste hauling would readily understand this method of refuse handling without further description as it is the standard procedure employed in the art.

The vehicles 200a-d are further outfitted with at least one vehicle operation transceiver 208a (e.g., a parking brake sensor, a wheel lock sensor, a gear shift sensor), as well as at least one waste disposal cycle transceiver, and preferably multiple sensors (e.g., a blade sensor, a fork sensor or the like) and preferably multiple waste disposal cycle transceivers. In addition, the vehicle preferably includes one or more cameras 208b for capturing data associated with a waste cycle event. The transceivers 208a may be sensors, transducers, or antennae, or any combination thereof. As understood from prior disclosures from which the present invention claims priority, additional transceivers may be located on the truck 200 for receiving a signal from the transmitting means 102 on the receptacles 100 and send a corresponding signal via wire, wireless, or any other medium to an on-board communication or data link 210. The signal from a given transceiver 208a may be response signal to the energy in the form of the signal transmitted by the transmitter means 102, or the signal may simply be a pass through signal, including conversion from a wireless signal to a signal carried by another medium such as a wire.

Figure 6:
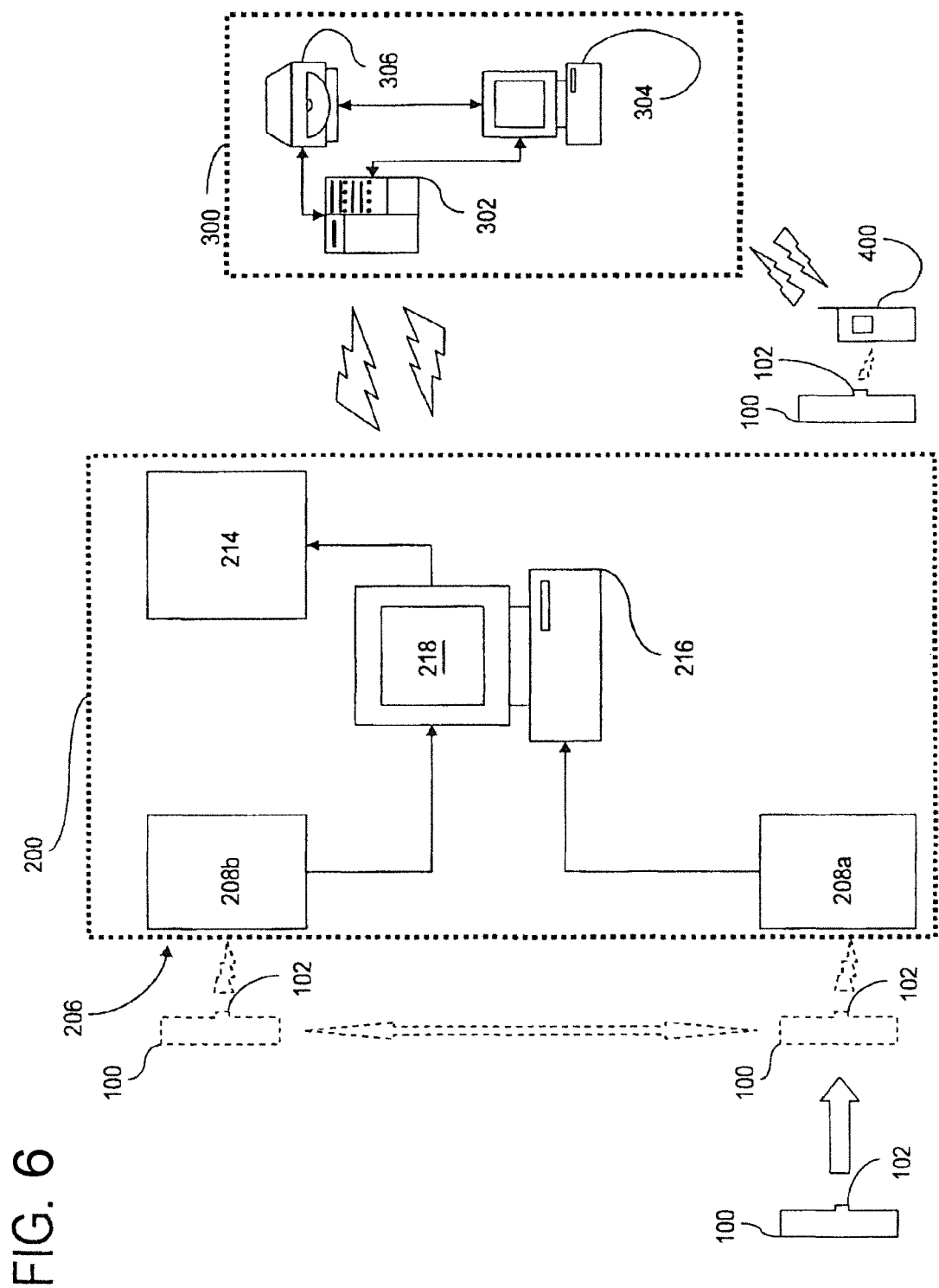
FIG. 6 is a block diagram of a communication process carried out by an on-board controller in conjunction with a remote data center.

As shown in the block diagram of FIG. 6, the vehicle 200 has a controller 214, for activating and deactivating the means for transferring the receptacle 212, in communication with an on-board computer 216. The controller 214 may further include an integrated GPS device, or such device may be a separate GPS connector (not shown) while still being connected to the controller. The on-board computer 216 optionally has a graphic interface 218 and provides the data or communication link to and from the transceivers 208a and the cameras 208b to the external site 300 via modem, firmware dongle or some other communication device. The controller 214 may also be a module within the on-board computer without departing from the spirit of the invention. Communication to and from the external site 300 is shown as wireless communication.

The external site 300 may include a server 302 in communication with computer 304 and a database 306, typically on the computer 304. Of course, the server 300 is not required to be at the same physical site as the computer 304, nor is it required for the database 306 to be stored on a computer separate from the server 302. The block diagram is merely an example of a possible layout. The only requirement for the external site 300 is the database 306 and a means for communication between the vehicles and database 306.

The vehicle operation transceivers 208a of the present invention will sense a vehicle operating condition (e.g., braking or parking the vehicle) which is indicative of a waste service fulfillment event). Likewise, the waste cycle event transceivers will sense one or more events corresponding to a waste service fulfillment event. In the event that such inputs from the vehicle operating and waste cycle transceivers 208a are provided to the controller, and those events occur when the GPS sensor of controller 214 determines that the truck 200 is located at a previously identified customer's location that is recorded in the database 306, then such information, will be used by the database 306 to generate a waste service fulfillment event (e.g., refuse is being picked up from the customer's location). Further, the database 306 will optionally prompt a control signal back to the vehicle 200 to cause the camera 208b to begin recording data corresponding to the waste receptacle 100 being serviced. Thus, the claimed system can be used in place of or in confirmation of an RFID reading process to read the RFID tags 102 on the receptacle 100.

The architecture for providing the communication between the vehicle and the database can comprise a queue-based message architecture. The system includes an asynchronous publication of business event messages (e.g., service fulfillment events) via a controller 214/GPS hardware connector connected to the vehicle and connected by a vehicle electrical bus to one or more transceivers 208a which can interrogate the vehicle and pass information onto the controller 214/GPS hardware connector without requiring interrogation activities by the vehicle operators. The controller 214/GPS hardware connector then sends the events to provide messages to one or more distributed client locations, so as to enable asynchronous business event publication. Thus, each client is sent messages which are maintained and persist in a queue until a remote client location (e.g., whether database 306, server or a browser or a mobile device with an appropriate application) acknowledges that the message has been received and processed. This arrangement enables the components or layers of the system to execute independently while still interfacing with each other.

Specific architecture components for enabling such a messaging system include the Amazon Simple Queue Service (SQS), which enables decoupling of the components of a cloud application. The SQS jumpstart resources can enable a variety of web protocols and languages for use with such messaging to clients, including .NET, Java, JavaScript, PHP, Python, Ruby and JMS). Alternatively, clients can access their queues via standards-based APIs (e.g., SOAP/REST over HTTPS). Of course, this architecture can support client mobile application development for use with publicly available mobile operating systems, such as Android or iOS. Data security for the messages can be provided with keyed-hash message authentication codes (HMACs), such as HMAC-SHA signatures and binary to text encoding such as Base64.

This architecture enables real-time or near-real time web services for data inquiries by clients through such interfaces. The service provider exposes an API stack to enable consumers to fetch specific data sets. A client or the service provider can query current information or aggregate summaries on-demand. Moreover, customers can quickly develop customer applications to call service provider APIs, which are preferably built upon open standards.

Data received from the vehicles is secured and stored by the service provider on a remote server farm 302 and can be accessed by the customer for historical analysis. Customers can view aggregate data sets to understand more about their inefficiencies and identify opportunities for improvement Reports provide user-friendly visualizations for business users to easily pinpoint trends, patterns, and operational anomalies.

The messages provided by the present system architecture enable the service provider to continuously recognize and capture discrete events from transceiver 208a as they occur. Such events include, for example GPS/vehicle Positions, rule exceptions, engine faults, vehicle status changes and trip updates. The service provider may thus publish near real-time event streams to the above mentioned customer applications (i.e., the subscribers). The customers, in turn, can control how to react to the received events. For example, customers (either by themselves or with the service provider) can generate business rules to dictate a specific response based upon the published event type. Customers can thus key off of events, trends and patterns in the published messages to make real-time business decisions to improve fleet deployment and service fulfillment.

While the specific embodiments have been illustrated and described, numerous modifications come to mind without significantly departing from the spirit of the invention, and the scope of protection is only limited by the scope of the accompanying Claims.

What is claimed is:

1. An automated system for initiating recording and processing of a waste service fulfillment event in an absence of human interaction, the automated system comprising;
 a) a brake sensor connected to a brake of a waste truck;
 b) a fork sensor connected to a fork lift of the waste truck;
 c) a blade sensor connected to a blade of the waste truck;
 d) a controller unit located on the waste truck and electrically connected to at least each of the brake sensor, the fork sensor, and the blade sensor, the controller unit further including or connected to a GPS locator, wherein the controller unit is configured to:
  receive a brake sensor input from the brake sensor in response to the brake sensor sensing a braking of the waste truck,
  receive a fork sensor input from the fork sensor in response to the fork sensor sensing operation of the fork lift of the waste truck,
  receive a blade sensor input from the blade sensor in response to the blade sensor sensing operation of the blade of the waste truck, and
  receive, from the GPS locator, GPS information that corresponds to addresses of customers of the waste truck; and
 e) a database processor in communication with the controller unit and configured to:
  provide service fulfillment records to an external computing device remote from the automated system,
  determine that (i) the controller unit has received, in sequence, the brake sensor input, the fork sensor input, and the blade sensor input and (ii) the GPS information received by the controller unit from the GPS locator indicates that the waste truck is currently located at a known address of a customer of the waste truck, and
  in response to the determining, create a service fulfillment record associated with the customer of the waste truck.

2. The automated system of claim 1, wherein the database processor is located at a remote location from the waste truck and communicates wirelessly with the controller unit.

3. The automated system of claim 1, further comprising at least one camera attached to the waste truck and electrically connected to the controller unit, wherein the database processor is configured to, in response to receiving, in sequence, the brake sensor input, the fork sensor input, and the blade sensor input, and further in response to the GPS information received by the controller unit from the GPS locator indicating that, the waste truck is currently located at the known address of the customer of the waste truck, send a signal to the controller unit to actuate recording by the at least one camera.

4. An automated system for initiating recording and processing of a waste service fulfillment event in an absence of human interaction, the automated system comprising:
 a) at least one vehicular operational sensor connected to a waste truck;
 b) at least one waste disposal cycle sensor connected to the waste truck;
 c) a controller unit located on a waste truck and electrically connected to the at least one vehicular operational sensor, the at least one waste disposal cycle sensor, the controller unit further including or connected to a GPS locator, wherein the controller unit is configured to:
  receive a vehicular operational sensor input from the at least one vehicular operational sensor in response to the at least one vehicular operational sensor sensing at least one vehicle operational device of the waste truck,
  receive a waste disposal cycle sensor input from the at least one waste disposal cycle sensor in response to the at least one waste disposal cycle sensor sensing operation of at least one waste disposal cycle device of the waste truck, and
  receive, from the GPS locator, GPS information that corresponds to addresses of customers of the waste truck; and
 d) a database processor in communication with the controller unit and configured to:
  provide service fulfillment records to an external computing device remote from the automated system,
  determine that (i) the controller unit has received the vehicular operational sensor input and the waste disposal cycle input in a redefined sequence, and (ii) the GPS information received by the controller unit from the GPS locator indicates that the waste truck is currently located at a known address of a customer of the waste truck, and in response to the determining, create a service fulfillment record associated with the customer of the waste truck.

5. A method for initiating recording and processing of a waste service fulfillment event in the absence of human interaction, the method comprising;
receiving, by a controller unit located on a waste truck, in sequence, (i) a brake sensor input from a brake sensor connected to a brake of the waste truck, (ii) a fork sensor input from a fork sensor connected to a fork lift of the waste truck, and (iii) a blade sensor input from a blade sensor connected to a blade of the waste truck, wherein the controller unit is electrically connected to the brake sensor, the fork sensor, and the blade sensor, wherein the controller unit comprises a GPS locator;
receiving, from the GPS locator, GPS information that corresponds to addresses of customers of the waste truck;
determining that the GPS information received by the controller unit from the GPS locator indicates that the waste truck is currently located at a known address of a customer of the waste truck;
in response to receiving, in sequence, the brake sensor input, the fork sensor input, and the blade sensor input, and further in response to determining that the GPS information received by the controller unit from the GPS locator indicates that the waste truck is currently located at the known address of the customer of the waste truck, generating, by a database processor communicatively coupled to the controller unit, a waste service fulfillment record associated with the known address and the customer; and
transmitting, by the database processor, the waste service fulfillment record to an external computing device remote from the waste truck.

6. The method of claim 5, wherein the database processor is located at a remote location from the waste truck and communicates wirelessly with the controller unit.

7. The method of claim 5, further comprising:
in response to receiving, in sequence, the brake sensor input, the fork sensor input, and the blade sensor input, and further in response to determining that the GPS information received by the controller unit from the GPS locator indicates that the waste truck is currently located at the known address of the customer of the waste truck, transmitting, by the database processor, to at least one camera attached to the waste truck and electrically connected to the controller unit, a signal to actuate recording; and
in response to receiving the signal, recording, by the at least one camera, data corresponding to a waste receptacle being serviced at the known address.

8. A method for initiating recording and processing of a waste service fulfillment event in the absence of human interaction, the method comprising;

receiving, by a controller unit located on a waste truck, (i) a vehicular operational sensor input from at least one vehicular operational sensor connected to the waste truck in response to the at least one vehicular operational sensor sensing at least one vehicle operational device of the waste truck and (ii) a waste disposal cycle sensor input from at least one waste disposal cycle sensor connected to the waste truck in response to the at least one waste disposal cycle sensor sensing operation of at least one waste disposal cycle device of the waste truck, wherein the controller unit is electrically connected to the at least one vehicular operational sensor and the at least one waste disposal cycle sensor, wherein the controller unit comprises a GPS locator;
determining that the vehicular operational sensor input and the waste disposal cycle sensor input were received in a predefined sequence;
receiving, from the GPS locator, GPS information that corresponds to addresses of customers of the waste truck;
determining that the GPS information received by the controller unit from the GPS locator indicates that the waste truck is currently located at a known address of a customer of the waste truck;
in response to determining that the vehicular operational sensor input and the waste disposal cycle sensor input were received in the predefined sequence, and further in response to determining that the GPS information received by the controller unit from the GPS locator indicates that the waste truck is currently located at the known address of the customer of the waste truck, generating, by a database processor communicatively coupled to the controller unit, a waste service fulfillment record associated with the known address and the customer; and
transmitting, by the database processor, the waste service fulfillment record to an external computing device remote from the waste truck.

9. The automated system of claim 4, wherein the at least one vehicle operational device of the waste truck comprises one or more of a brake of the waste truck, a wheel of the waste truck, or a gear of the waste truck.

10. The automated system of claim 4, wherein the at least one waste disposal cycle device of the waste truck comprises one or more of a lift arm of the waste truck or a blade of the waste truck.

11. The method of claim 8, wherein the at least one vehicle operational device of the waste truck comprises one or more of a brake of the waste truck, a wheel of the waste truck, or a gear of the waste truck.

12. The method of claim 8, wherein the at least one waste disposal cycle device of the waste truck comprises one or more of a lift arm of the waste truck or a blade of the waste truck.

* * * * *